(12) United States Patent
Nguyen

(10) Patent No.: US 7,073,006 B2
(45) Date of Patent: Jul. 4, 2006

(54) IMPLEMENTING HARDWARE INTERRUPT EVENT DRIVEN MECHANISM TO OFFER SOFT REAL-TIME UNIVERSAL SERIAL BUS

(75) Inventor: Tom L. Nguyen, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 714 days.

(21) Appl. No.: 09/921,862

(22) Filed: Aug. 2, 2001

(65) Prior Publication Data

US 2003/0028697 A1 Feb. 6, 2003

(51) Int. Cl.
*G06F 13/24* (2006.01)

(52) U.S. Cl. .................... 710/260; 710/261; 710/262
(58) Field of Classification Search .......... 710/260–262
See application file for complete search history.

(56) References Cited

U.S. PATENT DOCUMENTS

| | | | |
|---|---|---|---|
| 5,958,020 A | * | 9/1999 | Evoy et al. ................ 710/3 |
| 6,105,141 A | | 8/2000 | Hanlon et al. |
| 6,178,514 B1 | * | 1/2001 | Wood ...................... 713/300 |
| 6,434,643 B1 | * | 8/2002 | Ejiri ......................... 710/58 |
| 6,615,288 B1 | * | 9/2003 | Herzi ........................ 710/10 |
| 6,760,850 B1 | | 7/2004 | Atkinson et al. |

* cited by examiner

*Primary Examiner*—Tim Vo
(74) *Attorney, Agent, or Firm*—Blakley, Sokoloff, Taylor & Zafman LLP

(57) ABSTRACT

A system and method for implementing hardware event driven soft real-time interrupts on a serial bus. In one embodiment, the serial bus comprises a universal serial bus. One embodiment of the presently described system includes a client device coupled to a host device. In one embodiment, the host places the client device in an interrupt mode by causing the client device to enter a suspend state. While in the interrupt mode, the client device sends an interrupt request signal to indicate it has interrupt data. In one embodiment, the host device indicates to the client device to enter the interrupt mode by sending a set interrupt mode signal. In response, the client device enters the interrupt mode and sends an interrupt request signal to the host to indicate it has interrupt data.

22 Claims, 5 Drawing Sheets

IMPLEMENTING HARDWARE INTERRUPT EVENT DRIVEN MECHANISM TO OFFER SOFT REAL-TIME UNIVERSAL SERIAL BUS

TECHNICAL FIELD

This disclosure relates generally to event driven interrupts, and in particular but not exclusively, relates to implementing a soft real-time event driven interrupt on a serial bus.

BACKGROUND INFORMATION

Personal computers ("PCs") are used in conjunction with a plethora of peripheral devices. These peripheral devices include keyboards, mice, printers, external data storage devices, networking hubs, MP3 players, personal digital assistants ("PDAs"), etc. Traditionally, a parallel port or a serial port has been the preferred communication link between these peripheral devices and the PC. These communication links afford quick and easy connection to the PC without requiring the end-user to open the PC housing.

However, modern peripheral devices are capable of more complex and higher speed operation, requiring a higher bandwidth connection to the PC. Recently, the Universal Serial Bus ("USB") standard has emerged as an effective, low cost and higher bandwidth technique for an end-user to easily attach or detach peripheral devices to the PC without turning off the PC.

The USB ease of use and higher bandwidth capabilities have made peripheral devices more numerous and more popular than ever before. As a result, bandwidth consumption is once again an issue.

Currently, the USB standard does not implement real-time hardware interrupts; rather, it implements software virtual interrupts. Known techniques implement software virtual interrupts by periodically polling (i.e., querying) a peripheral device. The polling determines whether or not the peripheral device has virtual interrupt data pending from an interrupt event.

When a peripheral device is connected to a PC via the USB, it is coupled to a host device, located on the PC. A software driver running on the host device, known as the host controller driver, controls all data transfers that occur across the USB. A software program running on the PC that wishes to transfer data to/from the peripheral device must request the host device, operated by the host controller driver, to perform the desired data transfer.

To perform the known software virtual interrupt techniques, the host device must first establish a permanent virtual interrupt communication pipe between itself and the peripheral device. The host device uses this virtual interrupt communication pipe to periodically poll the peripheral device. If the peripheral device has pending interrupt data when polled, it will return the interrupt data to the host device. If the peripheral device does not have pending interrupt data when polled, it will return a NAK signal indicating an interrupt event has not occurred since it was last polled.

The host device will establish as many virtual interrupt communication pipes as there are peripheral devices coupled to it requiring interrupt communications over the USB. Polling each peripheral device occurs at predetermined intervals regardless of whether or not each peripheral device has an interrupt pending. Thus, known USB software interrupts waste USB bandwidth with needless polling of peripheral devices.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified. The present invention is illustrated by way of example and not limitation in the accompanying figures.

DETAILED DESCRIPTION

Embodiments of a system and a method for implementing a hardware event driven mechanism to offer a soft real-time interrupt on a serial bus are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Soft real-time interrupting is a type of the real-time interrupting, which is event driven interrupting. Event driven interrupting comprises signaling a central processing unit ("CPU") or other logical device in response to an occurrence of a physical event. Soft real-time interrupting is different from hard real-time interrupting in terms of time critical requirements. Hard real-time interrupts are implemented using dedicated interrupt signal lines to the CPU. The moment an interrupt event occurs at a peripheral device, an interrupt signal is transmitted to the CPU along the dedicated interrupt signal line. The CPU may then obtain the interrupt data corresponding to the interrupt signal over a data bus. Soft real-time interrupts are implemented without the use of dedicated interrupt signal lines. The interrupt signal is transmitted to the CPU over the data bus at predetermined times. Thus, an interrupt event that occurs between the predetermined times for transmitting an interrupt signal is known as a pending interrupt, and the interrupting peripheral device must wait to send an interrupt signal to the CPU.

Figure 1:
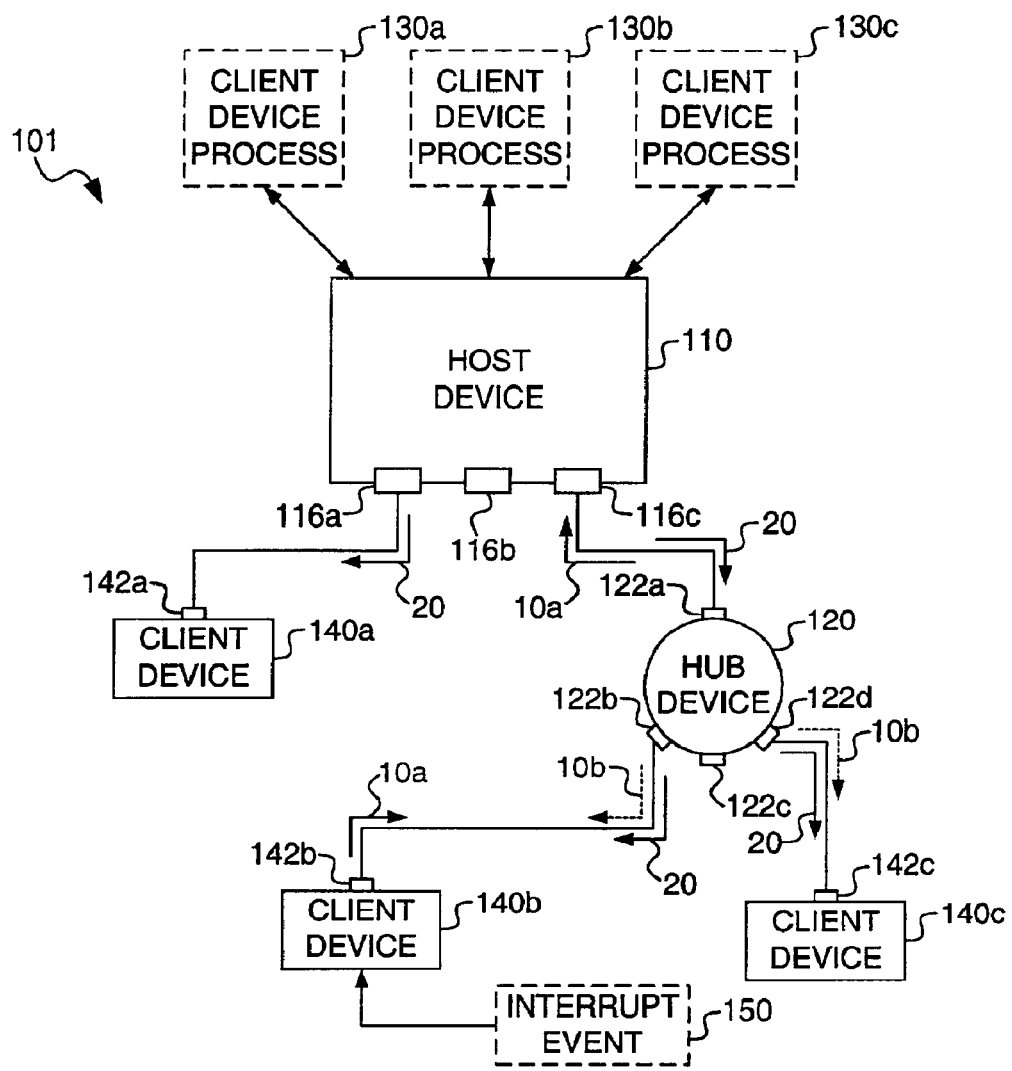
FIG. 1 illustrates one embodiment of a universal serial bus ("USB") system for implementing embodiments of a soft real-time interrupt process in accordance with the teachings of the present invention.

FIG. 1 illustrates an embodiment of Universal Serial Bus ("USB") system 101 for implementing soft real-time interrupts in accordance with the teachings of the present invention. USB system 101 includes host device 110, hub device 120, peripheral devices, henceforth referred to as client devices 140a, 140b, and 140c, and client device processes 130a, 130b, and 130c.

Client device 140a having a port 142a is coupled to a port 116a of host device 110. Hub device 120 having upstream port 122a and downstream ports 122b, 122c, and 122d couples client devices 140b and 140c to host device 110. Upstream port 122a is coupled to a port 116c of host device 110. Ports 142b and 142c of client devices 140b and 140c, respectively, are coupled to downstream ports 122b and 122d of hub device 120, respectively.

Ports 116a and 116c of host device 110 and ports 122b and 122d of hub device 120 are enabled ports indicating that they are coupled to a client device. A port 116b of host device 110 and port 122c of hub device 120 are disabled ports indicating that they are coupled to no client device.

As shown in FIG. 1, client devices 140a, 140b, and 140c can be coupled directly to host device 110 or indirectly via hub device 120. It should be appreciated that a plurality of client devices, in a plurality of configurations, may be coupled to host device 110 using multiple hub devices 120 linked together. Furthermore, although the illustrated embodiment of host device 110 has three ports 116a, 116b, and 116c, embodiments may have any number of such ports. Similarly, embodiments of hub device 120 may have any number of downstream ports.

In one embodiment, client device processes 130a, 130b, and 130c are software programs running on a personal computer ("PC") and interacting with client devices 140a, 140b, and 140c, respectively, via host device 110. Client device processes 130a, 130b, and 130c issue requests to host device 110 to initiate data transfers to/from client devices 140a, 140b, and 140c, respectively.

In one embodiment host device 110 is located within the PC and includes both software components and hardware components. The software components (e.g., software drivers) are located on a memory device coupled to host device 110 and/or to a CPU of the PC. In one embodiment, a software component, known as the USB system driver, communicates with client device processes 130a, 130b, and 130c. The USB system driver receives the data transfer requests from client device processes 130a, 130b and 130c. In one embodiment, the hardware components execute the physical data transfers under the control of another software component, known as the host controller driver.

Figure 2:
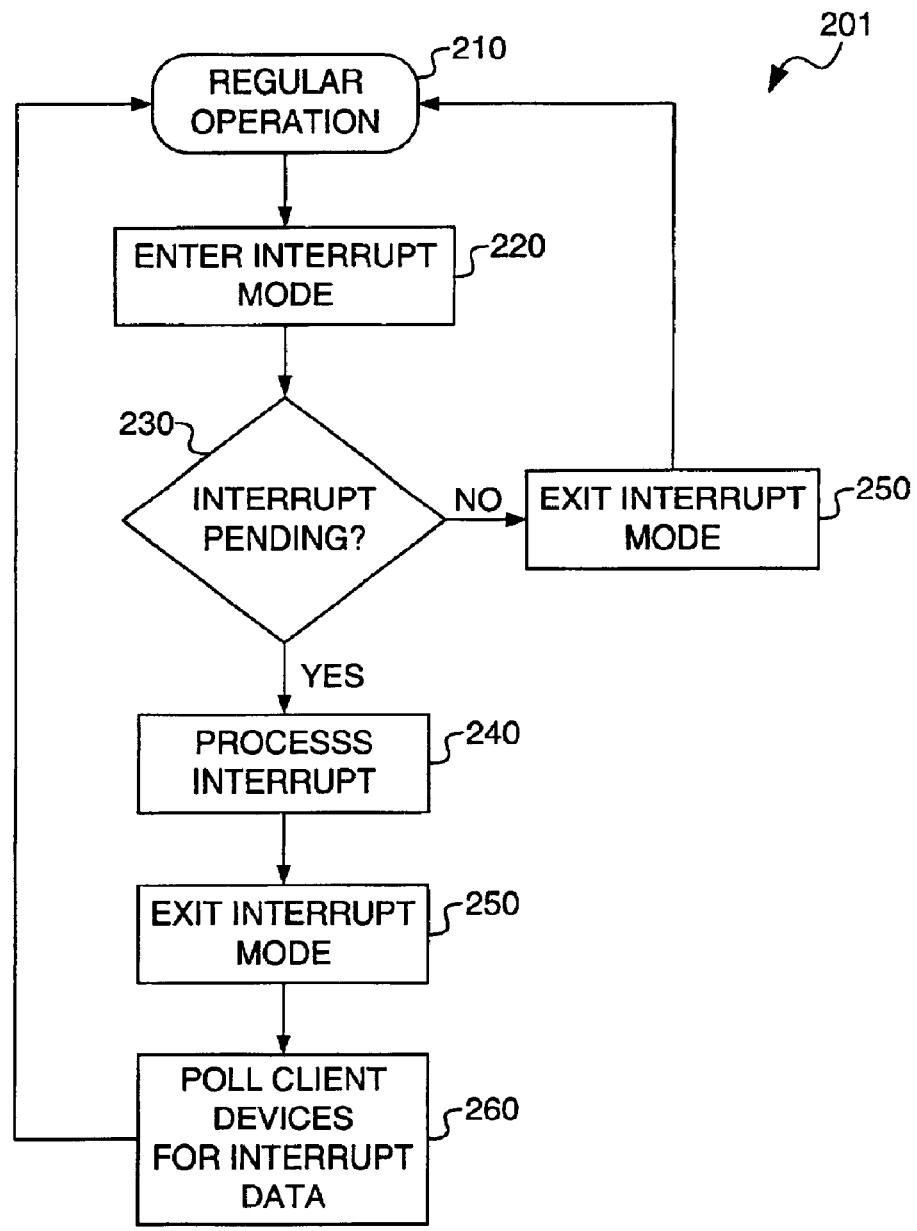
FIG. 2 is a high-level block diagram illustrating one embodiment of a soft real-time interrupt process in accordance with the teachings of the present invention.

FIG. 2 is a high-level flow diagram illustrating an embodiment of a soft real-time interrupting process 201 in accordance with the teachings of the present invention. Embodiments of soft real-time interrupting process 201 are implemented by embodiments of USB system 101 (FIG. 1) and by embodiments of a USB system 401 (FIG. 4), discussed below. It should be noted that embodiments of soft real-time interrupting process 201 might implement process blocks 210, 220, 240, 250 and 260 and decision block 230 with multiple sub-process blocks.

Process block 210 represents host device 110 in a regular operation mode. Host device 110 enters the interrupt mode (process block 220) at predetermined intervals. In one embodiment, the interval periodicity comprises a default setting, such as for example, every five milliseconds. In another embodiment, it is set by host device 110 according to the operational requirements of client devices 140a, 140b, and 140c. In the latter embodiment, the interval periodicity is set with reference to the client device 140a, 140b, or 140c having the most frequent interrupt communication with its corresponding client device process 130a, 130b, or 130c.

In one embodiment, once host device 110 has entered the interrupt mode by completing process block 220, it waits for a period of time to receive an interrupt request ("IRQ") signal 10a (FIG. 1). If client devices 140a, 140b, or 140c have no interrupts pending (decision block 230), host device 110 will receive no IRQ signal 10a, and thus, exits the interrupt mode (process block 250). Exiting the interrupt mode with no interrupts pending results in host device 110 returning to the regular operation mode (process block 210).

If, for example, client device 140b has an interrupt pending (decision block 230), as the result of an interrupt event 150 (FIG. 1), it will send IRQ signal 10a to host device 110 (process block 240). After receiving IRQ signal 10a, host device 110 exits the interrupt mode (process block 250) and begins polling client devices 140a, 140b, and 140c (process block 260). Host device 110 polls each client device 140a, 140b, and 140c to determine which sent IRQ signal 10a, and therefore, has interrupt data to send to its corresponding client device process 130a, 130b, or 130c.

In one embodiment, host device 110 polls each client device 140a, 140b, and 140c by executing a three phase IN transaction, repeated for each client device 140a, 140b, and 140c. Host device executes the first phase of the IN transaction with client device 140a by sending an IN token packet to client device 140a. The IN token packet is a request to client device 140a to transmit the interrupt data to host device 110 during a second phase of the IN transaction. The second phase consists of an IN data packet sent from client device 140a to host device 110. If, for example, client device 140a did not have an interrupt pending during the interrupt mode it will have no interrupt data. Therefore client device 140a returns the IN data packet containing a NAK signal to host device 110. The last phase is an acknowledge packet sent to client device 140a from host device 110 acknowledging receipt of the IN data packet.

In one embodiment, host device 110 executes the first phase of the IN transaction with client device 140b by sending an IN token packet to client device 140b. If, for example, client device 140b did have an interrupt pending during the interrupt mode it will have interrupt data. Therefore, client device 140b responds to the IN token packet by sending an IN data packet to host device 110 containing the interrupt data. Host device 110 acknowledges error free receipt of the interrupt data by transmitting an acknowledge packet to client device 140b. Client device 140c, which for example, also does not have interrupt data, is polled in a similar manner to client device 140a.

In one embodiment, host device 110 systematically polls each client device 140a, 140b, and 140c. Once host device 110 obtains the interrupt data from client device 140b, it continues polling client devices 140a, 140b, and 140c until all client devices 140a, 140b, and 140c are polled. Then host device 110 returns to the regular operation mode (process block 210). Since it is possible for more than one client device 140a, 140b, or 140c to have an interrupt pending during the interrupt mode, host device 110 continues polling after retrieving interrupt data from client device 140b, to ensure that interrupt data from all client devices 140a, 140b, and 140c is retrieved.

In an alternative embodiment, host device 110 stops polling after receiving interrupt data from client device 140*b* and returns to the regular operation mode (process block 210). Modifying the above example, assume that client device 140*c* did have an interrupt pending during the interrupt mode and therefore has interrupt data. In this alternative embodiment, client device 140*c* would again send an IRQ signal during the next interrupt mode cycle.

Various embodiments of the present invention poll client devices 140*a*, 140*b*, and 140*c* in various orders. In one embodiment, host device 110 systematically polls each client device 140*a*, 140*b*, and 140*c* in the same order during each polling cycle. In another embodiment, host device 110 polls client device 140*a*, 140*b*, and 140*c* in alternating orders during each polling cycle. In yet another embodiment, host device 110 polls client device 140*a*, 140*b*, and 140*c* in random orders during each polling cycle. Combinations of the above discussed polling methods are within the scope of various embodiments.

Figure 3:
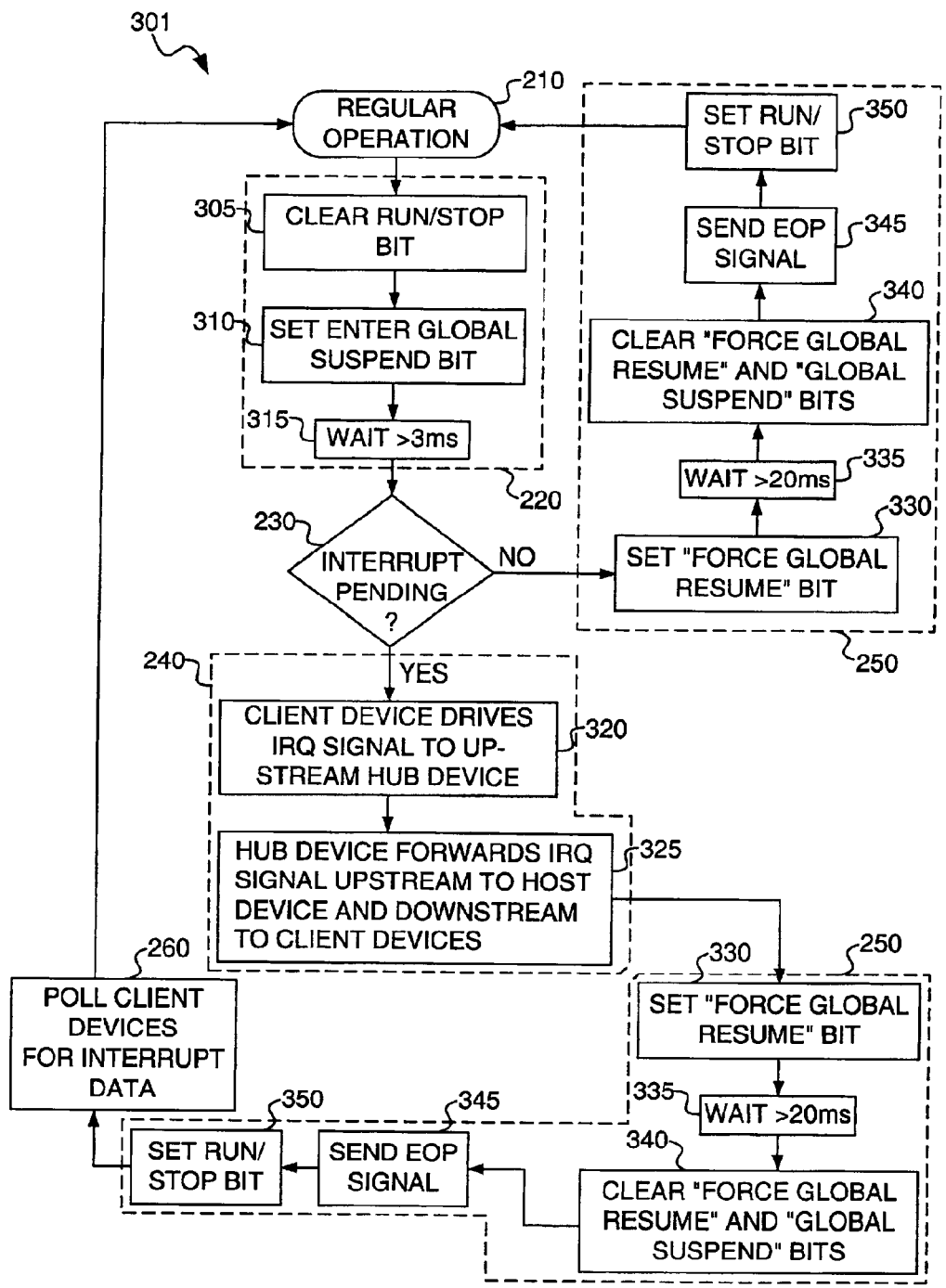
FIG. 3 is a block diagram of one embodiment of a soft real-time interrupt process in accordance with the teachings of the present invention.

FIG. 3 is a flow diagram illustrating one embodiment of a soft real-time interrupting process 301 in accordance with the teachings of the present invention. Embodiments of soft real-time interrupting process 301 are implemented by embodiments of USB system 101 (FIG. 1).

The depicted embodiment of soft real-time interrupting process 301 references status bits of the Universal Host Controller ("UHC") Command Register for explanation purposes; however, the depicted embodiment is not intended to limit the scope of the invention to the UHC platform. Other embodiments according to the present invention may be applied to the Open Host Controller ("OHC") platform, other Original Equipment Manufacture ("OEM") platforms controlling various types of serial buses, or the like.

In one embodiment of the soft real-time interrupting process 301, USB system 101 begins entering the interrupt mode (process block 220) from the regular operation mode (process block 210) when host device 110 clears a "run/stop" bit (process block 305) of its Command Register. The "run/stop" bit stops host device 110 from executing USB transactions over the USB.

Next, host device 110 sets an "enter global suspend" bit of its Command Register (process block 310) causing all downstream USB transactions to cease, eventually resulting in a global suspend of USB system 101. For embodiments following Compaq et al., USB Specification, (Rev. 1.1, Sep. 23, 1998), hereinafter "USB Specification Rev. 1.1", client devices 140*a*, 140*b*, and 140*c* and hub device 120 enter a suspend state when an idle bus is detected for three milliseconds. Once hub device 120 and client devices 140*a*, 140*b*, and 140*c* have entered suspend states, USB system 101 has entered the global suspend state, and thus entered the interrupt mode.

It should be appreciated that client devices 140*a*, 140*b*, and 140*c*, hub device 120 and host device 110 enter the interrupt mode at different times during execution of process blocks 220. However, the exact instant that any of client devices 140*a*, 140*b*, and 140*c*, hub device 120 or host device 110 is deemed to have entered the interrupt mode is a matter of mere formality. In one embodiment, host device 110 enters the interrupt mode after executing process block 305. In another embodiment, host device 110 enters the interrupt mode after process block 310 is executed. In yet another embodiment, host device 110 enters the interrupt mode after process block 315 is executed. In one embodiment, client devices 140*a*, 140*b*, and 140*c* enter the interrupt mode after sensing three milliseconds of idle bus time. In one embodiment, hub device 120 enters the interrupt mode after sensing three milliseconds of idle bus time.

Once in the global suspend state, if no client device 140*a*, 140*b*, 140*c* has an interrupt pending (decision block 230), USB system 101 begins exiting the interrupt mode (process blocks 250) by first setting a "force global resume" bit of the Command Register (process block 330). The "force global resume" bit results in host device 110 broadcasting a resume signal 20 (FIG. 1) onto enabled ports 116*a* and 116*c*. Resume signal 20 is received by client device 140*a* and hub device 120. Hub device 120 responds by broadcasting resume signal 20 on its enabled ports 122*b* and 122*d*, which is received by client devices 140*b* and 140*c*, respectively. Upon receiving resume signal 20, client devices 140*a*, 140*b*, and 140*c* awake from the suspend state. For embodiments following the USB Specification Rev. 1.1, the resume signaling must be maintained by host device 110 for twenty milliseconds (process block 335) to give each client device 140*a*, 140*b*, and 140*c* sufficient time to recover from its suspended state and be ready to receive USB transactions. Next, host device 110 clears the "force global resume" and the "global suspend" bits of its Command Register (process block 340) and ends resume signaling by driving an end of packet ("EOP") signal (process block 345) onto enabled ports 116*a* and 116*c*. The EOP signal is received by client device 140*a* and client devices 140*b* and 140*c* via hub device 120. Finally, the "run/stop" bit of the Command Register is set (process block 350) allowing host device 110 to continue with the regular operation mode (process block 210).

Assume, for explanatory purposes, that while in the interrupt mode (and still the global suspend state) client device 140*b* has an interrupt pending (decision block 230) as the result of interrupt event 150 occurring since the last interrupt mode. In this example, USB system 101 processes the pending interrupt (process blocks 240). It should be noted that client devices 140*a* and 140*c* could also have interrupts pending; however, for simplicity they do not.

The first step of processing the pending interrupt is initiated by client device 140*b* by driving IRQ signal 10*a* on its port 142*b* to be received by port 122*b* of hub device 120 (process block 320). Although host device 110 normally controls all transactions on USB system 101, no bus conflict will result. Client device 140*b* will only drive IRQ signal 10*a*, in response to interrupt event 150, after USB system 101 enters the global suspend state. Thus, even though interrupt event 150 may occur prior to USB system 101 entering the interrupt mode, client device 140*b* will wait until it enters the interrupt mode (and therefore the global suspend state) to drive IRQ signal 10*a*.

Hub device 120 responds to IRQ signal 10*a* by driving IRQ signal 10*a* on its upstream port 122*a*. Furthermore, in one embodiment, hub device 120 responds by reflecting IRQ signal 10*a*, illustrated in FIG. 1 as reflected IRQ signal 10*b*, on its enabled downstream ports 122*b* and 122*d* process block 325).

In one embodiment, after host device 110 receives IRQ signal 10*a*, client device 140*b* and hub device 120 stop transmitting IRQ signal 10*a* upstream and relinquish control of the serial bus. Additionally, USB system 101 begins exiting the interrupt mode (process blocks 250) as described above.

After completing process blocks 250, host device 110 polls client devices 140*a*, 140*b*, and 140*c* to determine which client device 140*a*, 140*b*, or 140*c* initiated IRQ signal 10*a* and to retrieve the interrupt data generated by interrupt event 150. Finally, host device 110 returns to the normal operation mode 210.

It should be appreciated that process block 260 may be accomplished many different ways, including those described above. In one embodiment, polling client devices 140a, 140b, or 140c occurs during the regular operation mode. Alternatives for retrieving the interrupt data include obtaining the interrupt data through communication pipes using isochronous transfers, control transfers, or bulk transfers. Alternative methods of determining which client device 140a, 140b or 140c sent IRQ signal 10a and retrieving the corresponding interrupt data are within the scope of various embodiments of the present invention.

In one embodiment, IRQ signal 10a further serves as a resume signal indicating a wakeup request from the global suspend state. When host device 110 receives IRQ signal 10a while in the interrupt mode, host device 110 interprets IRQ signal 10a as an IRQ and not a wakeup request. Receiving IRQ signal 10a while USB system 101 is in the global suspend state, initiated not for the purpose of processing interrupts, is interpreted by host device 110 as the resume signal indicating a wakeup request. Although the suspend state, while USB system 101 is in the interrupt mode, and the suspend state otherwise are identical from the perspective of client devices 140a, 140b, and 140c, they are not from the perspective of host device 110. Host device 110 initiates the interrupt mode and is therefore capable to differentiate between the two meanings of IRQ signal 10a.

Embodiments following the USB Specification Rev. 1.1 require twenty-three milliseconds to carryout the above-described embodiment of soft real-time interrupting process 301. The twenty-three milliseconds are a result of placing client devices 140a, 140b, and 140c in suspend states. At least three milliseconds are required for USB system 101 to enter the interrupt mode and at least twenty milliseconds are required for USB system 101 to exit the interrupt mode. A limitation of embodiments of this process is that issues arise when isochronous transfers requiring continuous communication intervals of less than twenty-three milliseconds are attempted in conjunction with it.

Figure 4:
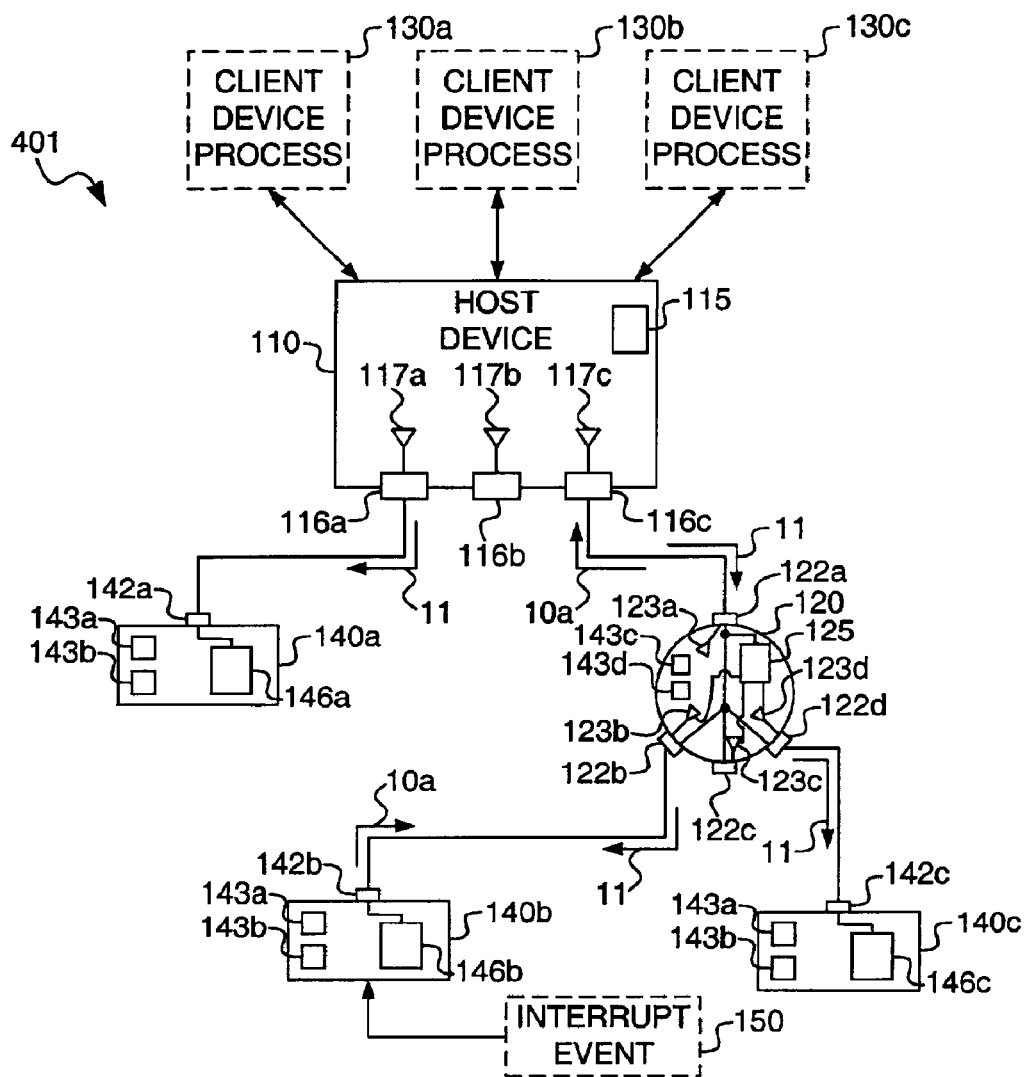
FIG. 4 illustrates one embodiment of a USB system for implementing embodiments of a soft real-time interrupt process in accordance with the teachings of the present invention.

FIG. 4 illustrates an embodiment of USB system 401 for implementing soft real-time interrupts in accordance with the teachings of the present invention. USB system 401 is similar to USB system 101, except that client devices 140a, 140b, and 140c include interrupt logic elements 146a, 146b, and 146c, respectively, non-interrupt capable interface 143a, and interrupt capable interface 143b. Additionally, host device 110 includes an interrupt logic element 115 and hub device 120 includes an interrupt logic element 125. In one embodiment, hub device 120 includes a non-interrupt capable interface 143c. In one embodiment, hub device 120 includes an interrupt capable interface 143d.

In one embodiment, interrupt logic elements 146a, 146b, and 146c are coupled to ports 142a, 142b, and 142c, respectively. They are coupled to receive signals therefrom.

In one embodiment, host device 110 includes output drivers 117a, 117b, and 117c coupled to ports 116a, 116b, and 116c. Output drivers 117a, 117b, and 117c drive signals onto ports 116a, 116b, and 116c, respectively.

In one embodiment, hub device 120 includes output drivers 123a, 123b, 123c, and 123d coupled to ports 122a, 122b, 122c, and 122d, respectively. Output drivers 123a, 123b, 123c, and 123d drive signals onto ports 122a, 122b, 122c, and 122d, respectively. Downstream ports 122b, 122c, and 122d of hub device 120 are coupled to upstream port 122a of hub device 120. Furthermore, in one embodiment, interrupt logic element 125 of hub device 120 is coupled to port 122a to receive signals therefrom and to output drivers 123b, 123c, and 123d to control their connectivity.

In one embodiment, interrupt logic element 115 comprises an application specific integrated circuit ("ASIC") capable of logical functions such as indicating to host device 110 to transmit a set interrupt mode signal 11. In another embodiment, interrupt logic element 115 comprises a software program operating on the PC and communicating with host device 110. In yet another embodiment, it comprises a programmable logic device ("PLD"), such as a programmable logic array ("PLA"). Other approaches, or combinations of the above, that implement the logical operations attributed to interrupt logic element 115 and described herein are within the scope of various embodiments.

In one embodiment, interrupt logic elements 146a, 146b, and 146c comprise ASICs capable of logical functions such as receiving and deciphering set interrupt mode signal 11 and/or indicating to client devices 140a, 140b, and 140c to transmit IRQ signal 10a. In another embodiment, they comprise general-purpose processors with corresponding memory buffers. In yet another embodiment, they comprise PLDs or PLAs. Other approaches, or combinations of the above, that implement the logical operations attributed to interrupt logic elements 146a, 146b, and 146c and described herein are within the scope of various embodiments.

In one embodiment, interrupt logic element 125 comprises an ASIC capable of logical functions such as receiving and deciphering set interrupt mode signal 11 and indicating to hub device 120 to float output drivers 123a, 123b, 123c, and 123d (i.e., place in high impedance states). In another embodiment, it comprises a general-purpose processor with corresponding memory buffer. In yet another embodiment, interrupt logic element 125 comprises a PLD or a PLA. Other approaches, or combinations of the above, that implement the logical operations attributed to interrupt logic element 125 and described herein are within the scope of various embodiments.

Figure 5:
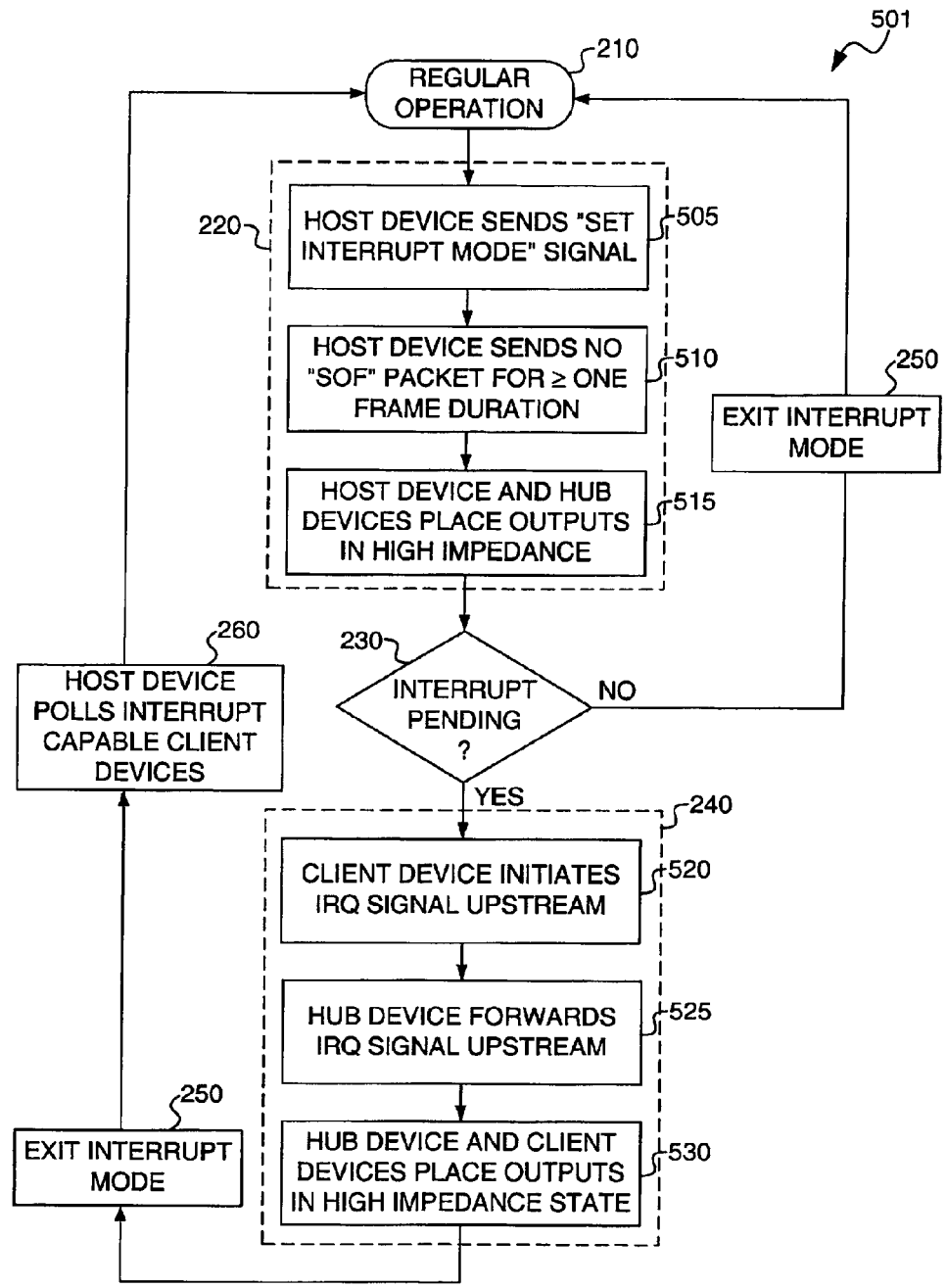
FIG. 5 is a block diagram illustrating one embodiment of a soft real-time interrupt process in accordance with the teachings of the present invention.

FIG. 5 is a flow diagram illustrating one embodiment of a soft real-time interrupting process 501 in accordance with the teachings of the present invention. Embodiments of soft real-time interrupting process 501 are implemented by embodiments of USB system 401 (FIG. 4).

Host device 110 enters the interrupt mode (process blocks 220) from the regular operation mode (process block 210) when interrupt logic element 115 indicates to host device 110 to enter the interrupt mode. In response to the indication, host device 110 drives set interrupt mode signals 11 onto its enabled ports 116a and 116c (process block 505). Set interrupt mode signal 11, driven on port 116a, is received by client device 140a. Set interrupt mode signal 11, driven on port 116c, is received by hub device 120. In response to receiving set interrupt mode signal 11, hub device 120 drives set interrupt mode signals 11 onto its enabled ports 122b and 122d to be received by client devices 140b and 140c, respectively. It should be appreciated that set interrupt mode signals 11 may be broadcast to the entire USB by host device 110 or to specific client devices only.

Set interrupt mode signals 11 are further received by interrupt logic elements 146a, 146b, 146c, and 125. Client devices 140a, 140b, and 140c and hub device 120 enter the interrupt mode after receiving an indication from interrupt logic elements 146a, 146b, 146c, and 125, respectively. In one embodiment, interrupt logic elements 146a, 146b, 146c, and 125 generate this indication after receiving set interrupt mode signal 11.

In another embodiment, after transmitting set interrupt mode signals 11, host device 110 withholds the transmission of a start of frame ("SOF") packet for a period of time equal to a frame duration (process block 510). For embodiments of USB systems 401 following the USB Specification Rev. 1.1, one frame duration is equal to one millisecond. The absence of the SOF packet is detected by interrupt logic elements 146a, 146b, 146c, and 125. In this embodiment, the combination of receiving set interrupt mode signal 11 and detecting the absence of the SOF packet for one frame duration causes interrupt logic elements 146a, 146b, 146c, and 125 to indicate to client devices 140a, 140b, and 140c and hub device 120, respectively, to enter the interrupt mode.

In yet another embodiment, interrupt logic elements 146a, 146b, 146c and 125 do not monitor the USB for the absent SOF packet. Rather, they wait for at least a period equal to one frame duration after receiving set interrupt mode signal 11 and then indicate to their respective client devices 140a, 140b, and 140c and hub device 120 to enter the interrupt mode.

In one embodiment, in response to the indication to enter the interrupt mode from interrupt logic element 125, hub device 120 floats (i.e., places in a high impedance state) its downstream output drivers 123b, 123c, and 123d (process block 515). Output drivers 123b, 123c, and 123d are floated to allow client devices 140b and 140c to drive an IRQ signal on their ports 142b and 142c, respectively, without causing a bus conflict.

Similarly, after sending set interrupt mode signal 11, host device 110 floats its enabled output drivers 117a and 117c to allow an IRQ signal to reach it without creating a bus conflict (process block 515).

In another embodiment, process blocks 510 and 515 occur contemporaneously. Since floating output drivers 117a and 117c results in a withheld SOF, the order of process blocks 510 and 515 is interchangeable or even concurrent.

When host device 110, client devices 140a, 140b, and 140c, and hub device 120 have each entered the interrupt mode, USB system 401 has entered the interrupt mode. Once USB system 401 has entered the interrupt mode, host device 110 is ready to receive an IRQ signal from one or more of client devices 140a, 140b, or 140c having a pending interrupt. If no client device 140a, 140b, or 140c has a pending interrupt (decision block 230) USB system 401 exits the interrupt mode (process block 250) and returns to the regular operation mode (process block 210).

However, if one of client devices 140a, 140b, or 140c does have a pending interrupt, USB system 401 processes the pending interrupt (process blocks 240). In the illustrated embodiment of FIG. 4, client device 140b has a pending interrupt. Interrupt event 150 causes client device 140b to store interrupt data to be communicated to its corresponding client device process 130b via host device 110. In response to the interrupt event, client device 140b transmits IRQ signal 10a (process block 520) to hub device 120, which in response transmits IRQ signal 10a to host device 110 (process block 525). IRQ signal 10a indicates to host device 110 that at least one of client devices 140a, 140b, and 140c has interrupt data to transmit to its corresponding client device process 130a, 130b, or 130c.

In one embodiment hub device 120 reflects IRQ signal 10a on enabled downstream ports 122b, and 122d. Similarly, in this embodiment host device 110 reflects IRQ signal 10a received on port 116c downstream on enable ports 116a and 116c.

After host device 110 receives IRQ signal 10a, client device 140b and hub device 120 stop transmitting IRQ signal 10a upstream. Hub device 120 floats output drivers 123a, 123b, 123c, and 123d (process block 530). Similarly, client devices 140a, 140b, and 140c float their output drivers (process block 530). All devices coupled to host device 110 must float their output drivers to give control over USB system 401 back to host device 110.

Finally, in one embodiment USB system 401 exits the interrupt mode (process block 250) and begins polling client devices 140a, 140b, and 140c (process block 260) to service all interrupt requests, as described above.

In one embodiment of soft real-time interrupting process 501, IRQ signal 10a further serves as the resume signal. IRQ signal 10a indicates a wakeup request to host device 110 when sent by a client device that is in the suspend state. When a client device sends IRQ signal 10a to host device 110 while in the interrupt mode, host device 110 interprets IRQ signal 10a as an IRQ. Since host device 110 indicates to client devices 140a, 140b, and 140c to enter the interrupt mode, it is capable to distinguish between an IRQ and a wakeup request.

In one embodiment, soft real-time interrupt process 501 is executed by USB system 401 without client devices 140a, 140b, and 140c entering the suspend state. Thus, in one embodiment USB system 401 enters and exits the interrupt mode within less than the idle bus time required to place client devices 140a, 140b, and 140c in the suspend state. As a result, client devices 140a, 140b, and 140c do not enter the suspend state and host device 110 need not wait for client devices 140a, 140b, and 140c to recover from the suspend state when exiting the interrupt mode. Therefore, embodiments of soft real-time interrupt process 501 require less time than embodiments of soft real-time interrupt process 301 to implement soft real-time interrupts on a USB.

In one embodiment, a client device which does not have an interrupt logic element to receive set interrupt mode signal 11 (henceforth a non-interrupt capable client device) is coupled to host device 110. The non-interrupt capable client device is coupled concurrently with client devices 140a, 140b, and 140c having interrupt logic elements 146a, 146b, and 146c (henceforth interrupt capable client devices), respectively. In this embodiment, non-interrupt capable client devices are not capable to send IRQ signal 10a during the interrupt mode described in embodiments of soft real-time interrupt process 501. Therefore, it is not necessary for host device 110 to poll non-interrupt capable devices. In one embodiment, host device 110 only polls interrupt capable client devices, in response to IRQ signal 10a, to determine which interrupt capable client device has a pending interrupt. Polling only interrupt capable client reduces the polling time of process block 260 (FIG. 5).

In one embodiment, hub device 120 does not include interrupt logic element 125 to receive set interrupt mode signal 11 (henceforth non-interrupt capable hub device). In this embodiment, host device 110 indicates to interrupt logic elements 146b and 146c of client devices 140b and 140c, respectively, to select and enable non-interrupt capable interfaces 143a (FIG. 4) for communication with the non-interrupt capable hub device. Non-interrupt capable interface 143a causes client devices 140b and 140c to interact with the non-interrupt capable hub device and host device 110 as known client devices, which do not practice embodiments of the present invention. Furthermore, non-interrupt capable interfaces 143a are selected and enabled by host device 110 if any upstream hub device in the communicative path between client devices 140b and 140c and host device 110 is non-interrupt capable.

In one embodiment, if all upstream hub devices include interrupt logic element 125 (henceforth interrupt capable hub devices), interrupt capable interfaces 143b are selected and enabled by host device 110. The interrupt capable client device with interrupt capable interface 143b enabled is capable to receive set interrupt mode signal 11, and therefore, capable to implement embodiments of soft real-time interrupting process 501.

In one embodiment, non-interrupt capable interface 143a comprises a physical port. In another embodiment, non-interrupt capable interface 143a comprises a virtual interface which is enable and disabled by host device 110 via interrupt logic elements 146a, 146b, or 146c, respectively. Similarly, in one embodiment, interrupt capable interfaces 143b comprise physical ports 142a, 142b, or 142c. In another embodiment, interrupt capable interfaces 143b comprise virtual interfaces enabled and disabled by host device 110 via interrupt logic elements 146a, 146b, or 146c.

In one embodiment, hub device 120 includes non-interrupt capable interface 143c and interrupt capable interface 143d (FIG. 4). In one embodiment, non-interrupt capable interface 143c and interrupt capable interface 143d comprise virtual interfaces for communicating with client devices. Interrupt capable interface 143d is capable of implementing embodiments of soft real-time interrupting process 501. Non-interrupt capable interface 143c is not, rather, it interfaces with a client device as a known hub device would.

Non-interrupt capable interface 143c is enabled when hub device 120 is coupled to a non-interrupt capable client device. Interrupt capable interface 143d is enabled when hub device 120 is coupled to an interrupt capable client device. In one embodiment, for example, an interrupt capable client device is coupled to port 122b of hub device 120 and a non-interrupt capable client device is coupled to port 122c of hub device 120. In this embodiment, interrupt capable interface 143d is enabled for communications on port 122b with the interrupt capable client device (e.g., client device 140b). Additionally, non-interrupt capable interface 143c is enabled for communications on port 122c with the non-interrupt capable client device. It should be appreciated that multiple instances of non-interrupt capable interface 143c and/or interrupt capable interface 143d may be enabled concurrently for communications on downstream ports 122b, 122c, and 122d.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system, comprising:
   a serial bus; and
   a host device coupled to the serial bus, the host device coupled to control communications on the serial bus, the host device having a interrupt logic element to indicate to the host device to enter an interrupt mode, the host device to transmit a set interrupt mode signal onto the serial bus after entering the interrupt mode, the set interrupt mode signal to indicate to a client device to be coupled to the serial bus to enter the interrupt mode.

2. The system of claim 1 wherein the host device is further coupled to withhold transmitting a start of frame ("SOF") packet after transmitting the set interrupt mode signal for at least a time period equal to a frame duration.

3. The system of claim 1 wherein the host device is coupled to request data from the client device in response to the host device receiving an interrupt request signal while in the interrupt mode.

4. The system of claim 1 wherein the serial bus comprises a universal serial bus.

5. The system of claim 3 wherein the interrupt request signal further serves as a resume signal when received by the host device while not in the interrupt mode.

6. The system of claim 3 wherein the host device is further coupled to request the data only from client devices to be coupled to the serial bus to enter the interrupt mode in response to receiving the set interrupt mode signal.

7. The system of claim 6 wherein a period of time required by the host device to request the data from the client devices coupled to enter the interrupt mode is less than a period of time of serial bus inactivity that will cause the client devices to enter a suspend state.

8. A client device, comprising:
   a serial bus port, the serial bus port to be coupled to a host device; and
   an interrupt logic element coupled to the serial bus port, the interrupt logic element to indicate to the client device to enter an interrupt mode in response to detecting an absence of a start of frame packet signal for at least a time period equal to a frame duration after receiving a set interrupt mode signal.

9. The client device of claim 8 wherein the client device to drive an interrupt request signal onto the serial bus port while the client device is in the interrupt mode, the interrupt request signal to be sent in response to an interrupt event.

10. The client device of claim 8 further comprising:
    a non-interrupt capable interface, the non-interrupt capable interface to be enabled when coupling the client device to a non-interrupt capable hub device or a non-interrupt capable host device; and
    an interrupt capable interface, the interrupt capable interface to be enabled when coupling the client device to an interrupt capable hub device and/or a interrupt capable host device.

11. The client device of claim 8 wherein the serial bus port comprises a universal serial bus port.

12. The client device of claim 9 wherein the interrupt request signal further serves as a resume signal when the client device is not in the interrupt mode.

13. A method, comprising:
    coupling a host device to a client device via a serial bus;
    generating interrupt data in response to an interrupt event;
    entering an interrupt mode at the direction of the host device; after entering the interrupt mode, sending an interrupt request signal to the host device in response to the interrupt data; and
    exiting the interrupt mode.

14. The method of claim 13 wherein the method is performed without the client device entering a suspend state.

15. The method of claim 13 wherein entering the interrupt mode comprises idling the serial bus until the client device enters a suspend state, the host device initiating the idle serial bus.

16. The method of claim 14 wherein entering the interrupt mode comprises receiving a set interrupt mode signal from the host device.

17. The method of claim 14 wherein the interrupt request signal further serves as a resume signal when sent by the client device in a suspend state.

18. The method of claim 15 wherein sending the interrupt signal comprises sending a resume signal from the client device to the host device while the client device is in the interrupt mode, the host device capable to interpret the resume signal as an interrupt request.

19. The method of claim 16 wherein entering the interrupt mode further comprises detecting an absence of a start of frame packet for at least a time period equal to a frame duration after receiving the set interrupt mode signal.

20. The method of claim 18 wherein exiting the interrupt mode comprises transmitting a resume signal from the host device onto the serial bus for at least a period of time required by the client device to recover from the suspend state.

21. A machine-readable medium on which a plurality of machine instructions are stored that when executed by a machine performs the operations of:

entering a host device of a serial bus into an interrupt mode;

sending a set interrupt mode signal from a host device to a client device coupled to the host device, the set interrupt mode signal to indicate to the client device to enter the interrupt mode;

withholding transmission of a start of frame packet from the host device after sending the set interrupt mode signal for at least a time period equal to a frame duration;

receiving an interrupt request signal sent from the client device; and exiting the host device from the interrupt mode.

22. The machine-readable medium of claim 21 wherein the interrupt request signal further serves as a resume signal when received by the host device while not in the interrupt mode.

* * * * *